United States Patent
Pu

(10) Patent No.: US 10,202,044 B2
(45) Date of Patent: Feb. 12, 2019

(54) MID-ENGINE EXTENDED RANGE ELECTRIC VEHICLE

(71) Applicant: TECHNOLOGIES' XANADU OF RESONATORY-SOLAR-SYSTEMED CO., LTD., Beijing (CN)

(72) Inventor: Jin Pu, Beijing (CN)

(73) Assignee: TECHNOLOGIES' XANADU OF RESONATORY-SOLAR-SYSTEMED CO., LTD., Beijing (CN)

( * ) Notice: Subject to any disclaimer, the term of this patent is extended or adjusted under 35 U.S.C. 154(b) by 0 days.

(21) Appl. No.: 15/574,462

(22) PCT Filed: Jan. 13, 2016

(86) PCT No.: PCT/CN2016/070750
§ 371 (c)(1),
(2) Date: Nov. 15, 2017

(87) PCT Pub. No.: WO2016/184145
PCT Pub. Date: Nov. 24, 2016

(65) Prior Publication Data
US 2018/0141442 A1    May 24, 2018

(30) Foreign Application Priority Data

May 20, 2015 (CN) .......................... 2015 1 0259749

(51) Int. Cl.
*B60K 1/00* (2006.01)
*B60L 11/06* (2006.01)
(Continued)

(52) U.S. Cl.
CPC ............ *B60L 11/06* (2013.01); *B60L 11/002* (2013.01); *B60L 11/08* (2013.01); *B60L 11/12* (2013.01);
(Continued)

(58) Field of Classification Search
CPC ........ B60L 11/06; B60L 11/002; B60L 11/12; B60L 11/08; B60L 11/003; B60K 6/00;
(Continued)

(56) References Cited

U.S. PATENT DOCUMENTS

| | | | | | |
|---|---|---|---|---|---|
| 4,554,989 A | * | 11/1985 | Gruich | ..................... | B60K 3/04 180/65.245 |
| 6,054,838 A | * | 4/2000 | Tsatsis | ..................... | B60K 6/12 180/165 |

(Continued)

FOREIGN PATENT DOCUMENTS

| CN | 1689185 A | 10/2005 |
|---|---|---|
| CN | 101071864 A | 11/2007 |

(Continued)

OTHER PUBLICATIONS

International Search Report and Written Opinion dated Apr. 11, 2016 for the corresponding PCT international application.

(Continued)

*Primary Examiner* — James M Dolak
(74) *Attorney, Agent, or Firm* — Platinum Intellectual Property LLP

(57) ABSTRACT

A mid-engine extended range electric vehicle includes a vehicle body, a turbo shaft engine, a battery pack, an electric generator, a vehicle control unit, drive motors, a gas controller, a battery controller, a gas storage tank and an intake box. Wherein the vehicle body includes a main body, bottom structure thereof forms frames of the vehicle; the engine is arranged on the frames between front and rear axles and near to the rear axle; an output shaft axis of the engine is located on a symmetry plane of the vehicle body, and an air inlet thereof faces tail of the vehicle; the intake box is communicated with the air inlet and is communicated with intake grilles on a covering piece of the vehicle body via pipelines. The vehicle has features of high effective energy conversion, (Continued)

good operating performance, long endurance mileage and high strength body.

6 Claims, 2 Drawing Sheets

(51) Int. Cl.
*B60L 11/08* (2006.01)
*B60L 11/12* (2006.01)
*B60L 11/00* (2006.01)
*B60L 1/00* (2006.01)
*B60W 10/06* (2006.01)

(52) U.S. Cl.
CPC ............. *B60L 1/003* (2013.01); *B60W 10/06* (2013.01); *Y02T 10/7077* (2013.01); *Y02T 10/7241* (2013.01)

(58) Field of Classification Search
CPC ... B60K 6/08; B60K 6/24; B60K 6/20; B60K 6/22
See application file for complete search history.

(56) References Cited

U.S. PATENT DOCUMENTS

| | | | | |
|---|---|---|---|---|
| 6,213,234 B1* | 4/2001 | Rosen | ............... | B60K 6/00 180/65.245 |
| 7,910,250 B2* | 3/2011 | Hsu | ............... | B60L 11/1881 180/65.21 |
| 8,534,401 B2* | 9/2013 | Dimitrov | ............... | B60W 20/13 180/65.31 |
| 8,561,747 B2* | 10/2013 | Domes | ............... | B60K 1/00 180/302 |
| 8,657,046 B2* | 2/2014 | Caudill | ............... | B60K 6/00 180/302 |
| 8,710,691 B2* | 4/2014 | Haddad | ............... | B60K 16/00 290/55 |
| 9,540,998 B2* | 1/2017 | Schlak | ............... | F02C 3/00 |
| 9,776,492 B2* | 10/2017 | Chen | ............... | B60K 1/04 |
| 2002/0066608 A1* | 6/2002 | Guenard | ............... | B60K 1/00 180/65.22 |
| 2005/0252696 A1 | 11/2005 | Kaufman | | |
| 2006/0099472 A1 | 5/2006 | Hsu | | |
| 2012/0255799 A1 | 10/2012 | Kohler et al. | | |
| 2012/0312620 A1 | 12/2012 | Fuechtner et al. | | |
| 2013/0087400 A1 | 4/2013 | Fuechtner | | |
| 2014/0077508 A1 | 3/2014 | Prokopich | | |
| 2014/0349808 A1 | 11/2014 | Huang et al. | | |
| 2015/0224866 A1 | 8/2015 | Parenti et al. | | |
| 2018/0093575 A1* | 4/2018 | Jin | ............... | B60L 11/12 |

FOREIGN PATENT DOCUMENTS

| | | |
|---|---|---|
| CN | 202082014 U | 12/2011 |
| CN | 102762401 A | 10/2012 |
| CN | 102917902 A | 2/2013 |
| CN | 202782642 U | 3/2013 |
| CN | 202782642 U | 3/2013 |
| CN | 103273829 A | 9/2013 |
| CN | 203580537 U | 5/2014 |
| CN | 103958260 A | 7/2014 |
| CN | 104602940 A | 5/2015 |
| CN | 104602940 A | 5/2015 |
| CN | 104802629 A | 7/2015 |
| JP | 2012144208 A | 8/2012 |
| WO | 2013000534 A1 | 1/2013 |

OTHER PUBLICATIONS

SIPO First Office Action dated Oct. 8, 2016 for the corresponding Chinese Patent Application.
SIPO Second Office Action dated May 27, 2017 for the corresponding Chinese Patent Application.

* cited by examiner

MID-ENGINE EXTENDED RANGE ELECTRIC VEHICLE

RELATED APPLICATIONS

This application is a United States National Stage Application filed under 35 U.S.C 371 of PCT Patent Application Serial No. PCT/CN2016/070750, filed Jan. 13, 2016, which claims Chinese Patent Application Serial No. CN 201510259749.2, filed May 20, 2015, the disclosure of all of which are hereby incorporated by reference in their entirety.

TECHNICAL FIELD

The present disclosure relates to the field of vehicle technology, and in particularly to an extended range electric vehicle in relative to an engine arrangement.

BACKGROUND

Modern vehicles are mainly categorized into several types, including vehicles using conventional piston engines as power source, and electromotor driven vehicles that are pure electric powered and of plug-in type, which using storage batteries for storing energy. Hybrid electric vehicle (HEV) is a new type of vehicle that has two power systems including a conventional piston engine and an electromotor. Existing HEVs generally adopt mechanical hybrid power structures and have two complete power systems including clutches, gearboxes, differential mechanisms and the like, these structures are complex and energy of batteries thereof is so small so as can only served for assisting driving and recovering braking energy. In contrast, a series HEV, i.e. an extended range electric vehicle, is driven directly by a motor, structure of which is simple and its batteries are operating in a state of not been fully charged and at excellent voltage platform, this guarantees service life of the batteries. It can also run in a pure electric mode thanks to large battery capacity. Engine thereof is always working in an optimum status with low emission and high efficiency. It also provided with an external charging mode in order to be charged using inexpensive off-peak electricity at night. Generally, existing extended range electric vehicles each uses a piston engine as a charger, and there is a huge difference between thermal efficiency of the piston engine and that of a combustion gas turbine. If using a traditional piston type internal combustion engine as power source, there would be a huge engine structure volume, so that reducing overall efficiency of the power systems in the extended range electric vehicle. Therefore, using a combustion gas turbine to generate electricity for the extended range electric vehicle has a broad application prospect.

Like an ordinary saloon car, in the existing hybrid electric vehicle, the engine is generally placed in the front, that is, the engine is placed at a location in front of front axle, and an output shaft of the engine is longitudinally arranged, an advantage of this is that arrangement and maintenance are convenient, but it is not easy to achieve a balance of load weight between front and rear wheels as well as left and right wheels, with large moment of inertia and poor controllability.

Among existing vehicles, there are also mid-engine vehicles or rear-engine vehicles, but these are rear-wheel drive fashions that generally adopted for improving controllability of the vehicle. However, once sideslip of the rear wheels is generated when a rear-wheel drive vehicle is cornering at a high speed, the vehicle is prone to oversteering, and extremely sharp turning makes the vehicle more likely to sideslip and out of control, which is dangerous for a sports car in high speed movement.

For a pure electric powered vehicle, middle part of its frames can be used for arranging and installing a battery pack thereto, such that a larger installation space may be acquired to obtain a bigger battery capacity. However, for a front-engine extended range electric vehicle, the arranging space of its battery pack is greatly squeezed due to an arranging location of the engine and a requirement on balance between front and rear wheels, the endurance mileage of the vehicle is affected thereby in a drive mode in which the vehicle is solely driven by means of battery pack discharging.

Modern compact vehicles generally adopt integral body structure or separate frame construction, wherein strength of the frames and of the entire framing are relatively low in the integral body structure although this kind of structure is easy to manufacture, and the separate frame construction also has a disadvantage of low strength of the vehicle body.

SUMMARY

An object of the present disclosure is to provide a mid-engine extended range electric vehicle, in which a combustion gas turbine is adopted as a power source and arranged at a location in front of rear wheels of the vehicle on a symmetrical center line thereof. An output shaft of the combustion gas turbine is longitudinally arranged, which has features of high effective energy conversion, good operating performance, long endurance mileage and high strength vehicle body.

A specific technical solution of the present disclosure is a mid-engine extended range electric vehicle, including a vehicle body, a turbo shaft engine, a battery pack, an electric generator, a vehicle control unit, drive motors, a gas controller, a battery controller, a gas storage tank and an intake box. Wherein the vehicle body comprises a main body and bottom structure thereof forms frames of the vehicle. The turbo shaft engine is arranged on the frames between front and a rear axles and near to the rear axle, an axis of an output shaft of the turbo shaft engine is located on a symmetry plane of the vehicle body, and an air inlet of the turbo shaft engine faces tail of the vehicle. The intake box is communicated with the air inlet of the turbo shaft engine and is communicated with intake grilles on a covering piece of the vehicle body via pipelines. The battery pack is arranged on the frames in front of the turbo shaft engine. A rotor of the electric generator and the output shaft of the turbo shaft engine are connected to each other. The drive motors drive front and rear wheels to rotate. The vehicle control unit comprises a converter and an inverter, the electric generator is a three-phase high speed permanent magnet motor, wherein a three-phase output end of the three-phase high speed permanent magnet motor is connected to a three-phase end of the converter, DC ends of the converter are connected to a DC input end of the battery controller and a DC input end of the inverter, respectively, and a three-phase output end of the inverter is connected to a three-phase end of each of the drive motors. The gas controller controls supplement of gas to a combustion chamber of the turbo shaft engine.

Furthermore, the main body is composed of a front suspension cabin, a rear suspension cabin and a safety cabin, the vehicle control unit is arranged on the frames within the front suspension cabin, and the gas storage tank is arranged in front of the turbo shaft engine.

Furthermore, the safety cabin is made of carbon fiber materials, and the front and the rear suspension cabins are of the frame structures of aluminum alloy pipes.

Furthermore, there are two intake grilles, which are symmetrically located on rear fenders on both sides of the vehicle body and are communicated with the intake box via two symmetrical pipelines.

Furthermore, suspensions of the front and rear wheels are double wishbone independent suspensions.

An advantageous effect of the present disclosure, as compared to the prior arts, is that the mid-engine extended range electric vehicle according to the present disclosure has the following advantages.

(1) The electric generator set for providing electric energy is a miniature combustion gas turbine and has features of high power-weight ratio, low power consumption, low emission, low noise and vibration, easy maintenance and long lifetime through innovative and optimized efforts of the inventor. The combustion gas turbine further has advantages of extremely large power density, smooth running and low noise. In general, volume of the combustion gas turbine is only one fourth to one fifth of that of a piston engine with equivalent power, this is depended on a continuous thermodynamic cycle nature of the combustion gas turbine itself, and thermal efficiency thereof may even reach up to 30%~60%, which is much higher than the piston engine.

(2) The present disclosure totally eliminates the use of an exhaust gas treatment system. During the entire combustion process of the turbo shaft engine, the combustion process of a four-stroke piston engine is replaced by a continuous and uninterrupted turbo shaft combustion chamber, in which the combustion process will not be interrupted. Further, the combustion chamber has a certain length so as to provide a combustion time that is long enough for completely burning fuel oil, and there is plenty of oxygen therein which is sufficient for an entire oxidation reaction to completely carried out. Therefore, combustion emission structure in the turbo shaft engine is greatly superior to the conventional piston engine, and is approximately one tenth to one twentieth the Euro 5 emission standard. Meanwhile, it is avoided to provide a whole set of exhaust gas treatment system like that in the piston engine and therefore unnecessary to maintain and repair any exhaust gas treatment system. As a result, environmental pollution due to failure of exhaust gas treatment system of the vehicle may also be prevented, thus fundamentally achieve improvement in emission level and improve the environmental protection performance.

(3) The intake box is adopted in front of the air inlet of the combustion gas turbine, which is capable of rapidly and sufficiently supplying turbo shaft engine with air to satisfy the usage requirements.

(4) The turbo shaft engine is placed in the middle, and center of gravity of the engine is located between the front and rear axles, the output shaft of the engine is located on a symmetrical center plane of the vehicle, and thus the center of gravity of the middle-placed engine is located on center of the vehicle body. Meanwhile, the battery pack is also arranged in the middle and the vehicle control unit is arranged at front part of the vehicle body, so that load weight ratio between the front and rear wheels is 50:50, weight distribution of the vehicle is ideal and balanced, inertia moment in a horizontal direction during high speed cornering is small, therefore the vehicle has advantages of good controllability, sharp steering, and a phenomenon of head-down and tail-up when braking is weak. An optimum motion performance is thus achieved in the hybrid electric vehicle according to the present disclosure.

(5) If the vehicle still adopts an ordinary linear arrangement of the turbo shaft engine and the electric generator, that is, an arrangement in which an air inlet, a compressor, a burner, a turbine and an electric generator behind the turbine's output shaft are arranged in a straight line, then in this case will give rise to an excessive demand on the arranging space, which cannot meet the arranging requirement of the vehicle. Therefore, arranging the electric generator at the air inlet of the turbo shaft engine may significantly reduce the entire installation size of the turbo shaft engine and the electric generator. Moreover, since weight of the turbo shaft engine will greatly affect the weight balance of the vehicle, in the case that the air inlet of the turbo shaft engine faces head of the vehicle, the electromotor and the entire inlet piping system need to be arranged in front of the turbo shaft engine, but the front space of the turbo shaft engine is already taken by a seat cabin, so that this may not meet the arranging requirement of the electromotor and the entire inlet piping system. Therefore, adopting the arrangement in which the air inlet of the turbo shaft engine faces the vehicle tail meets the requirement on the weight balance of the vehicle and also saves the arranging space.

(6) Arranging the engine in the middle allows the battery pack to have a larger arranging space without occupying the arranging space of the engine and thus a battery pack with a larger capacity can be arranged in the vehicle, since an extended-range mode is adopted, wherein electric energy is transmitted to the drive motors of the front wheels by the electric generator using cables such that eliminate any unnecessary clutch and speed changing devices and rotating shafts. Moreover, the engine may be installed directly on the frames without being arranged above the battery pack, which allows a more secure installation and a lower center of gravity, so as to facilitate the controllability of the vehicle.

(7) Adopting independent drive control of the front and rear wheels may not only achieve a good road adaptive performance, but also can independently and linearly control the torque output. In this case, a situation in an ordinary rear-wheel drive vehicle is prevented in which oversteer occurs when sideslip is generated on the rear wheels during high-speed cornering, and extremely sharp turning makes the vehicle more likely to sideslip and out of control. Independent driving mode of the front and rear wheels also solves a drawback of having poor straight line stability in the mid-engine vehicle.

(8) By adopting an integral vehicle body made of carbon fibers at the middle part and adopting high-strength vehicle bodies made of aluminum alloy pipe frames at the front and rear parts, respectively, not only the structure strength of the vehicle is completely satisfactory but also lighten its weight, thus improves the economic performance of energy source.

(9) The front and rear wheels adopt double-wishbone independent suspension systems, which have the advantages of large transverse stiffness, excellent anti-roll performance, good grip performance and clearer road feel.

DETAILED DESCRIPTION

Figure 1:
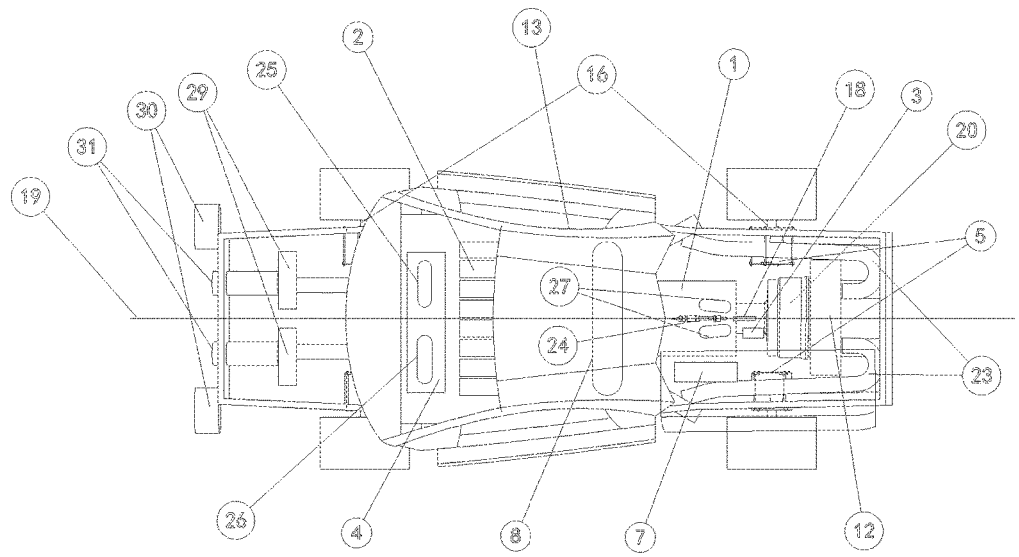
FIG. 1 is a top view of a mid-engine extended range electric vehicle according to the present disclosure.
Figure 2:
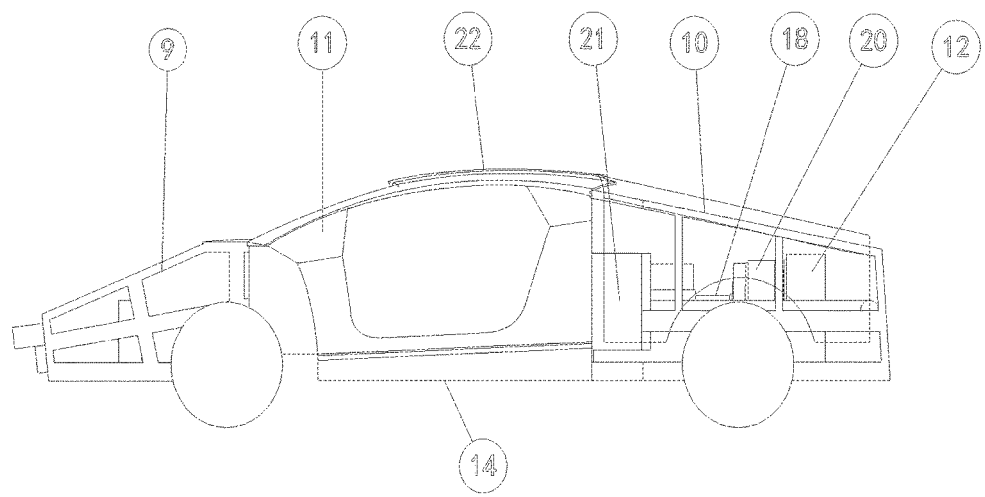
FIG. 2 is a front view of the mid-engine extended range electric vehicle according to the present disclosure.
Figure 3:
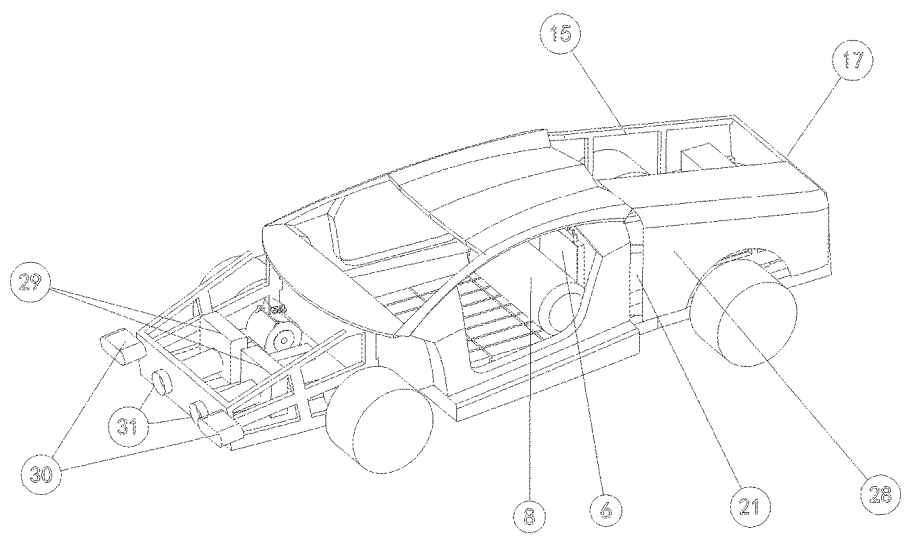
FIG. 3 is a schematic perspective view of the mid-engine extended range electric vehicle according to the present disclosure.

The technical solution of the present invention will be further described below in conjunction with the accompanying drawings.

The present disclosure provides a mid-engine extended range electric vehicle includes a turbo shaft engine 1, a battery pack 2, an electric generator 3, a vehicle control unit 4, drive motors 5, a gas controller 6, a battery controller 7, a gas storage tank 8, a front suspension cabin 9, a rear suspension cabin 10, a safety cabin 11 and an intake box 12.

The vehicle body comprises a vehicle main body 13 which is composed of the front suspension cabin 9, the rear suspension cabin 10 and the safety cabin 11, and a bottom structure 14 thereof form frames 15 of the vehicle. The safety cabin 11 is made of carbon fiber materials, and the front and rear suspension cabins 9 and 10 are of the frame structures of aluminum alloy pipes.

The turbo shaft engine 1 is arranged on the frames 15 between front and rear axles and near to the rear axle 16, an axis of an output shaft 18 of the turbo shaft engine 1 is located on a symmetry plane 19 of the vehicle body. An air inlet 20 of the turbo shaft engine 1 faces a tail 17 of the vehicle, and the electric generator 3 is also located behind the turbo shaft engine 1, thus, the air inlet 20 of the turbo shaft engine 1 is actually an annular sleeve, the electric generator 3 is arranged in center of the sleeve, the air that sucked via the sleeve is compressed through a compressor of the turbo shaft engine 1 and then into a combustion chamber 27 for combustion, such that a turbine is pushed to work. An output shaft 18 of the turbine and a shaft of a rotor 24 of the electric generator 3 are connected to each other, and a spindle of the turbo shaft engine 1 and the shaft of the rotor 24 of the electric generator 3 are installed on air bearings.

The intake box 12 is arranged behind the turbo shaft engine 1 and is communicated with the air inlet 20 of the turbo shaft engine 1. The intake box 12 is communicated with intake grilles 21 on a covering piece 22 of the vehicle body via pipelines 23, there are two intake grilles 21, which are symmetrically located on rear fenders 28 on both sides of the vehicle body, and are communicated with the intake box 12 via two symmetrical pipelines 23.

The rotor 24 of the electric generator 3 and the output shaft 18 of the turbo shaft engine 1 are connected to each other.

The battery pack 2 is arranged on frames 15 in front of the turbo shaft engine 1.

The electric generator 3 stores electrical energy in the battery pack 2, the battery pack 2 is respectively connected to the battery controller 7 and the drive motors 5, and the battery controller 7 is configured to regulate and control the battery output power.

Since a large amount of heat will be generated during frequent charging and discharging of the battery pack 2, battery radiators 29 are further arranged, intake grilles of two battery radiators 29 are arranged below head lights 30 of the vehicle, respectively, such that cold air passages 31 of the battery radiators 29 are directly guided to the battery pack 2 in order to constantly cool down the battery pack using cold air generated during running of the vehicle.

There are three drive motors 5, one of which is arranged on the frames 15 on the inner sides of the two rear wheels, and drives the front wheels to rotate through a transmission, another two drive motors 5 are symmetrically arranged on the frames 15 on the inner sides of the two rear wheels and drive the two rear wheels to independently rotate via transmissions, respectively. The drive motors 5 are Brusa 760V permanent magnet DC brushless motors. Motor controllers of the drive motors 5 can change the rotate speed under control of the vehicle control unit 4, and further drive an extended range electric vehicle.

The gas storage tank 8 is arranged on frames 15 in front of the turbo shaft engine 1, The gas storage tank 8 may be supported through a bracket and the battery pack 2 may be arranged underneath it. The gas storage tank 8 is located in a space just under a driver seat.

The electric vehicle according to the present disclosure may adopt two energy systems, i.e., a compressed natural gas (CNG) system and a liquefied natural gas (LNG' system. For the CNG system, the gas storage tank 8 will be a high pressure vessel, and its storage pressure is 20 MPa. The storage tank 8 is connected to a gas inlet of natural gas of the engine via a pipeline, and an anti-freeze relief valve is arranged in front of the gas inlet, which is heated by a circulation water bath, and the heat comes from other heating parts in the vehicle. For the LNG system, the gas storage tank 8 will be a thermal insulation tank, a thermal valve is opened when the engine needs to suck in the air, such as to vaporize liquefied gas after heat absorption of the gas and pressurize the gas to 0.5 MPa using a supercharger. Heat supply amount of the thermal valve is electrical controlled.

The vehicle control unit 4 is located on the frames 15 in the front suspension cabin 9. The battery controller 7 is located near the battery pack 2. In addition to controlling a steering system and a braking system of the vehicle, the vehicle control unit 4 further allocates torques of the three drive motors 5 via the motor controller to control a traveling system of the vehicle, and connects to the gas controller 6 of the turbo shaft engine 1 to control supplement of gas of the combustion chamber 27 of the turbo shaft engine 1 so as to change power output of the turbo shaft engine 1. The gas controller 6 is located in front of the turbo shaft engine 1.

The vehicle control unit 4 is further connected to a control end of the battery controller 7. The vehicle control unit 4 includes a converter 25 and an inverter 26, the electric generator 3 is a three-phase high speed permanent magnet motor, a bearing of the electric generator 3 is an air bearing. A three-phase output end of the three-phase high speed permanent magnet motor is connected to a three-phase end of the converter 25, DC ends of the converter 25 are connected to DC input ends of the battery controller 7 and of the inverter 26, respectively, and a three-phase output end of the inverter 26 is connected to a three-phase end of each of the drive motors 5. When the turbo shaft engine 1 starts up, the battery pack 2 drives the electric generator 3 to rotate via the battery controller 7 and the converter 25, so that the turbo shaft engine 1 acquires a rotate speed for initial starting.

The electric generator 3 mainly provides electricity for the vehicle, and the energy is fed in two separate directions, that is, flows to the battery pack 2 and to the drive motors 5. This means that the turbo shaft engine 1 may individually charge the battery pack 2 without supplying the drive motors 5 with electric energy; or the electric generator 3 transmits electric energy at rated power to the drive motors 5 and the battery pack 2 simultaneously based on an electrical control proportion (calculated and controlled by a central control circuit of the vehicle control unit 4); even in the case that the battery pack 2 has no electric energy storage at all and maximum powers are required for use of the drive motors 5, the electric generator 3 is fully able to supply all electric energy to the drive motors 5 without charge the batteries for the moment so as to guarantee a maximum power performance. Therefore, the extended range electric vehicle according to the present disclosure has the following several operating modes.

Mode 1: Static charging mode, that is, in a state that the drive motors 5 are not in operation and the vehicle is stopped, the electric generator 3 slowly or quickly charges the battery pack 2 by the control of the central control circuit of the vehicle control unit 4 (depending on requirements of a user).

Mode 2: Moving charging mode, that is, in the case that the drive motors 5 are working at standard powers and the electric generator 3 supplies the battery pack 2 with electricity, when the working powers of the drive motors 5 are elevated to be ultra-high, the electric generator 3 and the battery pack 2 supply the drive motors 5 with electricity simultaneously to instantaneously exhibit an extremely high vehicle performance.

Mode 3: If the batteries have been completely discharged but sill requires a high-performance running (e.g. in road condition of expressway), then the electric generator 3 drives the electromotor at a high power of 30-60 kW and provides a running velocity of 150-200 km/h without charging the battery pack 2; as soon as the energy consumption is reduced during the running, the vehicle is switched into Mode 2 automatically, and switched into working mode automatically after it is stopped.

What is claimed is:

1. A mid-engine extended range electric vehicle, comprising a vehicle body, a turbo shaft engine, a battery pack, an electric generator, a vehicle control unit, drive motors, a gas controller, a battery controller, a gas storage tank and an intake box, wherein the vehicle body comprises a vehicle main body, and a bottom structure of the vehicle main body forms frames of the vehicle, the turbo shaft engine is arranged on the frames between front and rear axles and near to the rear axle, an air inlet of the turbo shaft engine faces a tail of the vehicle, and an axis of an output shaft of the turbo shaft engine is located on a symmetry plane of the vehicle body, the intake box is communicated with the air inlet of the turbo shaft engine and arranged behind the turbo shaft engine, the intake box is also communicated with intake grilles on a covering piece of the vehicle body via pipelines, the battery pack is arranged on the frames in front of the turbo shaft engine, a rotor of the electric generator and the output shaft of the turbo shaft engine are connected to each other, and the electric generator is located between the turbo shaft engine and the intake box, the drive motors drive front and rear wheels to rotate, the vehicle control unit comprises a converter and an inverter, the electric generator is a three-phase high speed permanent magnet motor, wherein a three-phase output end of the three-phase high speed permanent magnet motor is connected to a three-phase end of the converter, DC ends of the converter are connected to a DC input end of the battery controller and a DC input end of the inverter, respectively, and a three-phase output end of the inverter is connected to a three-phase end of each of the drive motors, and the gas controller controls supplement of gas to a combustion chamber of the turbo shaft engine.

2. The mid-engine extended range electric vehicle according to claim 1, wherein the vehicle main body is composed of a front suspension cabin, a rear suspension cabin and a safety cabin, the vehicle control unit is arranged on the frames within the front suspension cabin, and the gas storage tank is arranged in front of the turbo shaft engine.

3. The mid-engine extended range electric vehicle according to claim 2, wherein the safety cabin is made of carbon fiber materials, and the front and rear suspension cabins are of the frame structures composed of aluminum alloy pipes.

4. The mid-engine extended range electric vehicle according to claim 1, wherein there are two intake grilles, which are symmetrically located on rear fenders on both sides of the vehicle body and are communicated with the intake box via two symmetrical pipelines.

5. The mid-engine extended range electric vehicle according to claim 1, further comprising two battery radiators, wherein inlet grilles of the two battery radiators are respectively symmetrically arranged below head lights of the vehicle, and cold air passages of the battery radiators are directly guided to the battery pack to constantly cool down the battery pack using cold air generated during running of the vehicle.

6. The mid-engine extended range electric vehicle according to claim 1, wherein suspensions of the front and rear wheels are double wishbone independent suspensions.

\* \* \* \* \*